United States Patent [19]
Eagle et al.

[11] Patent Number: 5,888,266
[45] Date of Patent: Mar. 30, 1999

[54] APPARATUS AND METHOD FOR PRODUCING A PRESSED GLASS ARTICLE

[75] Inventors: Peter T. Eagle, Perrysburg, Ohio; Arnold Bowling, Blairsville, Pa.

[73] Assignee: Thomas Industrial Gases, Inc., Rossford, Ohio

[21] Appl. No.: 914,436

[22] Filed: Aug. 19, 1997

[51] Int. Cl.$^6$ .................................................... C03B 40/00

[52] U.S. Cl. ................................ 65/169; 65/24; 65/25.1; 65/26; 65/170; 65/307; 425/95; 425/96; 425/412; 264/81; 427/133; 427/249; 427/255.3; 427/399; 427/446; 427/450

[58] Field of Search .............................. 65/24, 25.1, 26, 65/169, 170, 307, 319; 425/95, 96, 412; 264/81; 427/133, 249, 255.3, 399, 446, 450

[56] References Cited

U.S. PATENT DOCUMENTS

| | | |
|---|---|---|
| 3,052,629 | 9/1962 | Morrow et al. . |
| 3,094,404 | 6/1963 | Lauck . |
| 3,133,807 | 5/1964 | Denman et al. . |
| 3,203,777 | 8/1965 | Berry et al. . |
| 3,508,893 | 4/1970 | Duggan . |
| 3,523,016 | 8/1970 | Mattos . |
| 4,140,512 | 2/1979 | Carmi et al. . |
| 4,142,884 | 3/1979 | Jones, Jr. . |
| 4,333,756 | 6/1982 | Seeman . |

FOREIGN PATENT DOCUMENTS 688452   3/1978   U.S.S.R. .

OTHER PUBLICATIONS

Monsanto "Certificate of Quality" for Methyl Acetylene Propadiene, dated: Jul.13,1977.
Synthatron Corporation data sheet for ethyl acetylene.
Synthatron Corporation data sheet for dimethylacetylene.

*Primary Examiner*—Peter Chin
*Assistant Examiner*—Michael P. Colaianni
*Attorney, Agent, or Firm*—David C. Purdue; John C. Purdue

[57] ABSTRACT

Apparatus which is disclosed comprises a metal mold, a metal plunger and an annular manifold, and includes means for moving the plunger and the manifold between an open position in which the manifold surrounds the plunger and a gob of softened glass can be introduced into the mold and a closed position in which the manifold surrounds the plunger and the latter forms, with the mold and the manifold, a cavity in which a glass part can be formed. The manifold and the plunger have facing walls which are above the mold cavity, have portions which are in close fitting sliding engagement, and, thereabove, portions which diverge away from one another and form an annular space. The apparatus is operable, when the plunger and the manifold are in the open position, to cause a gas which is a mixture of at least one alkane and at least one unsaturated aliphatic hydrocarbon to flow from the manifold around the exterior of the plunger, through orifices which extend downwardly and inwardly through the manifold and to ignite the gas mixture so that it deposits a substantially invisible lubricious coating on the plunger. The orifices discharge the gas mixture into the annular space formed by the diverging walls of the manifold and plunger. There is an annular groove in the manifold which is open to the interior of the manifold, and an annular ring through which the downwardly and inwardly facing orifices extend. The ring is releasably engaged with the manifold and, except for the orifices, closes the groove in the manifold.

5 Claims, 4 Drawing Sheets

APPARATUS AND METHOD FOR PRODUCING A PRESSED GLASS ARTICLE

BACKGROUND OF THE INVENTION

This invention relates to improved apparatus and to an improved method for producing a pressed glass article. In particular, the apparatus includes means for causing a gas which is a mixture of at least one alkane and at least one unsaturated aliphatic hydrocarbon to flow from a manifold around the exterior of a plunger, means for igniting the gas so that it deposits a substantially invisible lubricious coating on the plunger., and means for advancing the plunger into a gob of molten glass in a mold. Preferably the gas which is caused to flow from the manifold is a mixture of from 40 to 70 parts by volume of "C-53 gas" (subsequently defined) and 60 to 30 parts by volume of methane.

THE PRIOR ART

Apparatus which includes means for advancing a plunger into a gob of molten glass in a mold while causing a gas which is a mixture of at least one alkane and at least one unsaturated aliphatic hydrocarbon to flow from a manifold around the exterior of the plunger so that it cools the plunger, the glass and the mold and deposits a substantially invisible lubricious coating on the plunger is known, being disclosed in U.S. Pat. No. 4,333,756, Seeman. This apparatus comprises a metal mold, a metal plunger and an annular manifold or ring assembly. The plunger is movable between a closed position in which it forms, with the mold and the manifold, a cavity in which a glass part, for example a plate, can be formed and an open position in which a gob of softened glass can be introduced into the mold. The manifold surrounds the plunger when the latter is in the closed position. The manifold and the plunger have facing walls which are above the mold cavity, have portions which are in close fitting sliding engagement and, thereabove, portions which diverge away from one another and form an annular space. There is an annular cylindrical tube inside the manifold which has a gas inlet and a gas outlet, both of which are outside the manifold. The gas outlet is closed by a cap when the apparatus is in operation. A gas which is a mixture of at least one alkane and at least one unsaturated aliphatic hydrocarbon flows through the gas inlet, and into the annular tube, from which it is discharged through orifices which extend inwardly and downwardly through the tube and through the manifold. The orifices direct the gas below the portions of the manifold and plunger which are in close fitting sliding engagement, toward the bottom of the mold, and onto the sides of the plunger as the mold is closed. The gob of softened glass ignites the gas; excellent lubrication and temperature control have been achieved with the apparatus when it has been used with shallow molds. However, with deep molds, for example, molds used to produce crock pots, meter covers and the like, the gob of molten glass is not effective to fire the gas; instead, carbon builds up on the bottom of the plunger, from which it is transferred to the bottoms of the pressed articles, and necessitates frequent interruption of the pressing operation for cleaning of the apparatus.

Unsuccessful attempts have been made to provide satisfactory lubrication of deep molds by adding pilot lights which direct opposed flames at the plunger when it is in its raised position, and spraying kerosene or mineral oil onto the raised plunger. This procedure is a health hazard when kerosene is used because acrolein, a known carcinogen contained in kerosene, is released, and leads to frequent operating problems, usually involving the formation of a varnish on the plunger surface and often causing one side of the plunger to stick in the mold while the opposite side advances to a lower position.

BRIEF DESCRIPTION OF THE INSTANT INVENTION

The instant invention is an improvement in the apparatus of the aforesaid U.S. Pat. No. 4,333,756. The improvement, in one embodiment, involves a change in the orifices so that they discharge into the annular space formed by the diverging walls of the manifold and plunger; the manifold and the plunger are raised together to the open position; and the mixture of at least one alkane and at least one unsaturated aliphatic hydrocarbon is caused to flow through the orifices into the annular space while the plunger and the manifold are in the raised, open position. Some of the gas mixture flows downwardly out of the annular space and is ignited by pilot lights; the flame travels upwardly into and above the annular space. The improvement is also a manifold composed of outer and inner rings which are frictionally engaged with one another when assembled for operation, and form an annular passage inside the manifold through which the mixture of at least one alkane and at least one unsaturated aliphatic hydrocarbon can flow to orifices which extend inwardly and downwardly through the inner ring for delivery as described into the annular space formed by the diverging walls of the manifold and plunger. The inner ring can easily be replaced whenever the orifices therethrough become plugged during operation.

OBJECTS OF THE INVENTION

It is, therefore, an object of the instant invention to provide improved apparatus for producing a pressed glass article.

It is another object to provide such apparatus wherein orifices through which a mixture of at least one alkane and at least one unsaturated aliphatic hydrocarbon gas flow into the annular space formed by the diverging walls of the manifold and plunger.

It is a further object to provide such apparatus wherein the orifices through which the gas mixture is discharged into the annular space formed by the diverging walls of the manifold and plunger, extend through a ring which can be readily replaced whenever the orifices become clogged.

It is still another object to provide an improved method for producing a pressed glass article.

Other objects and advantages will be apparent to those skilled in the art from the description which follows, reference being made to the accompanying drawings.

DESCRIPTION OF THE PREFERRED EMBODIMENTS

Figure 2:
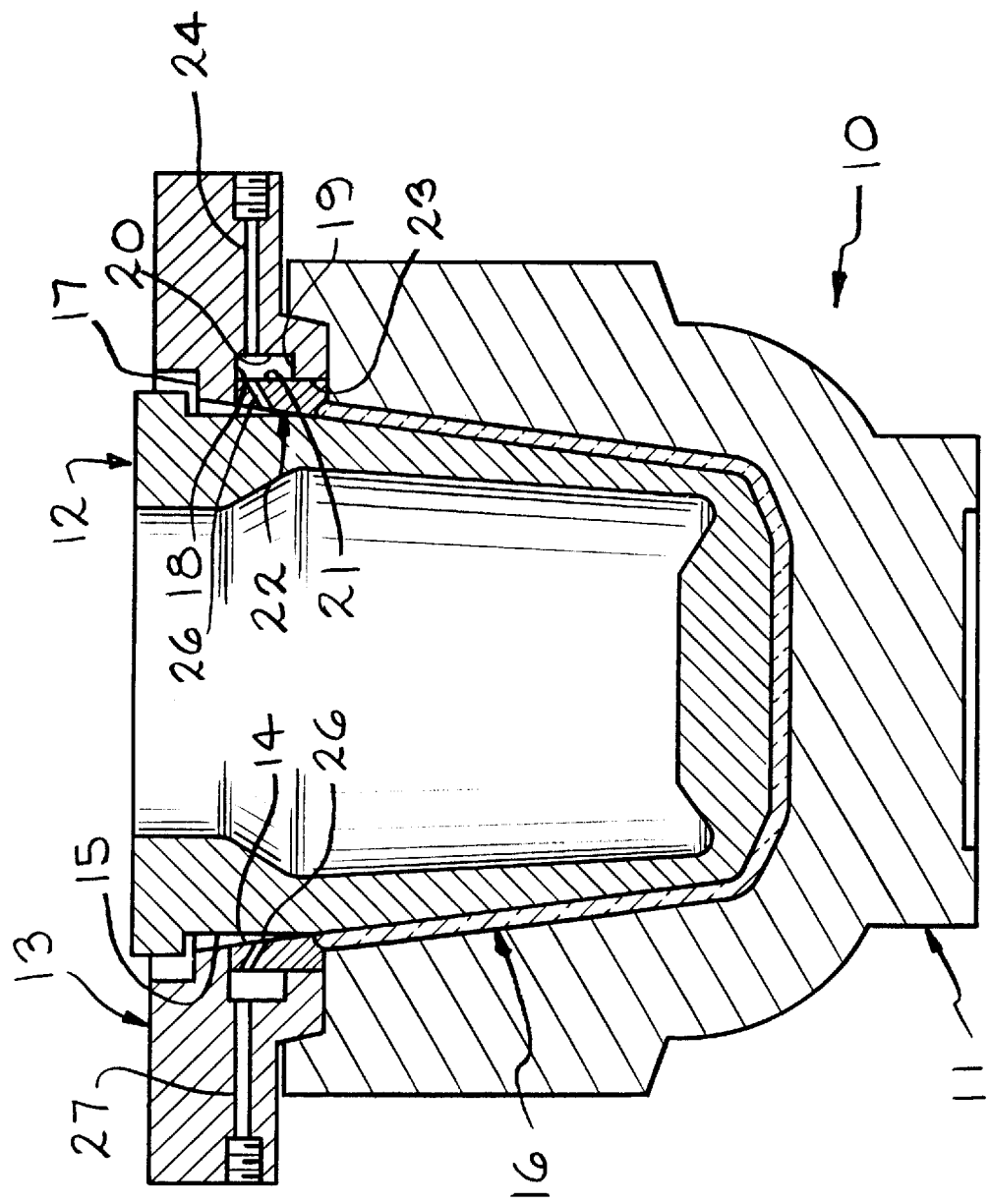
FIG. 2 is a schematic sectional view taken along the line 2—2 of FIG. 1.

Referring in more detail to the drawings and, in particular to FIG. 2, apparatus for producing a pressed glass article, shown in a fully closed position, is indicated generally at 10. The apparatus 10 includes a metal mold 11, a metal plunger 12 and an annular manifold 13 (commonly referred to as a ring assembly). The manifold 13, which surrounds the exterior of the plunger 12, can be made of stainless steel or of a high-nickel steel alloy. An annular, inwardly tapering surface 14 of the manifold 13 faces a vertical surface 15 of the plunger, and positions the plunger 12 with respect to the mold 11. A fully formed, pressed glass article is indicated at 16, disposed within a mold cavity bounded by forming surfaces of each of the mold 11, the plunger 12 and the manifold 13. A surface 17 of the manifold 13 serves as a stop for the plunger 12.

There is an annular space inside the manifold 13 which is surrounded by walls 18, 19 and 20 of the manifold 13 and an outer cylindrical surface 21 of a ring 22. The surface 21 of the ring 22 contacts and is frictionally engaged by an inner cylindrical surface 23 of the manifold 13. The frictional engagement locks the manifold 13 and the ring 22 against relative movement when the apparatus is in operation. A cooling and lubricating gas is caused to flow, as indicated by arrows, through a gas inlet 24 (FIG. 1) to the annular space, designated 25, inside the manifold 13 and to and through orifices 26 which extend inwardly and slightly downwardly through the ring 22 (see FIG. 2). A gas outlet 27 for the annular space 25 is closed when the apparatus is in operation.

Figure 3:
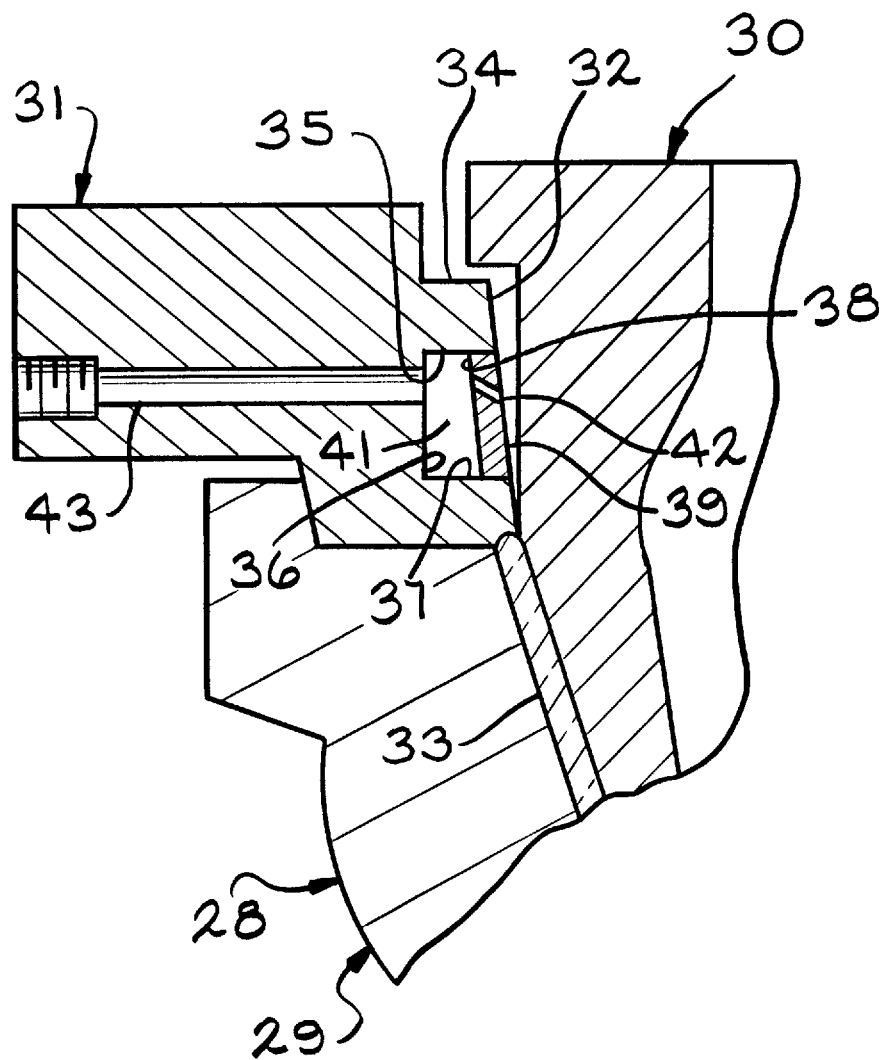
FIG. 3 is a fragmentary, partial sectional view showing apparatus which includes the improvement of another embodiment of the invention.

Referring to FIG. 3, another embodiment of the invention comprises apparatus for producing a pressed glass article, shown fragmentarily in a fully closed position, and indicated generally at 28. The apparatus 28 includes a metal mold 29, a metal plunger 30 and an annular manifold 31 (commonly referred to as a ring assembly). The manifold 31, which surrounds the exterior of the plunger 30, can be made of stainless steel or a high-nickel steel alloy. An annular, inwardly tapering surface 32 of the manifold 31 positions the plunger 30 with respect to the mold 29. A fully formed, pressed glass article is indicated at 33, disposed within a mold cavity bounded by forming surfaces of each of the mold 29, the plunger 30 and the manifold 31. A surface 34 of the manifold 31 serves as a stop for the plunger 30.

There is an annular channel inside the manifold 31, which is surrounded by walls 35, 36 and 37 of the manifold and by an inner cylindrical surface 38 of a ring 39. The ring 39 is brazed to the walls 35 and 37 of the manifold 31. A gas which is a mixture of a at least one alkane and at least one unsaturated aliphatic hydrocarbon is caused to flow through a gas inlet (not illustrated) and the annular channel (which is designated 41) and through orifices (one of which, designated 42, is shown in FIG. 3) which extend inwardly and slightly downwardly through the ring 39. A gas outlet 43 for the annular channel 41 is closed when the apparatus is in operation.

The Improved method of the instant invention for producing a pressed glass article will be more fully understood from the following Example.

EXAMPLE

Figure 1:
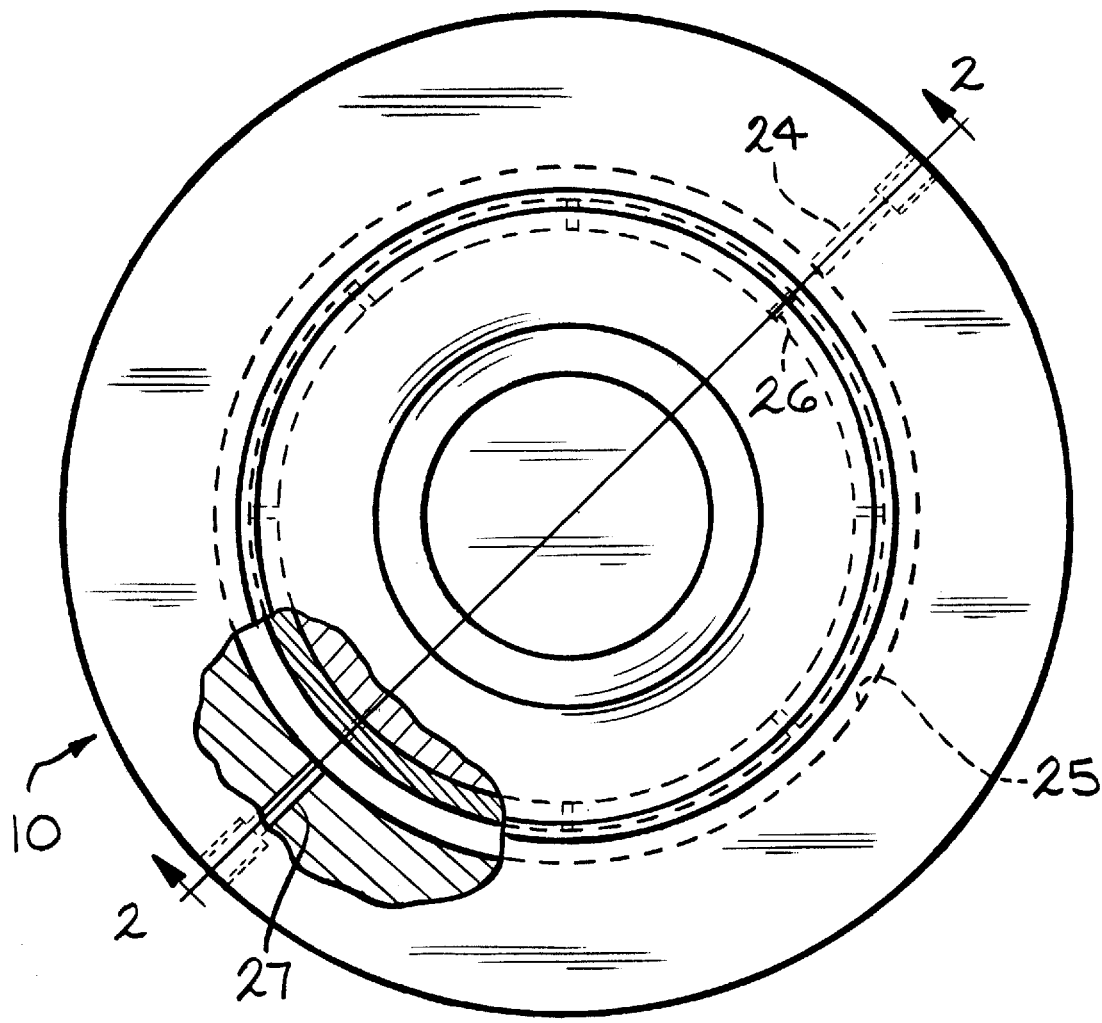
FIG. 1 is a top plan view, partially broken away to show details of construction, of a largely conventional glass pressing apparatus which includes the improvement of one embodiment of the instant invention.
Figure 4:
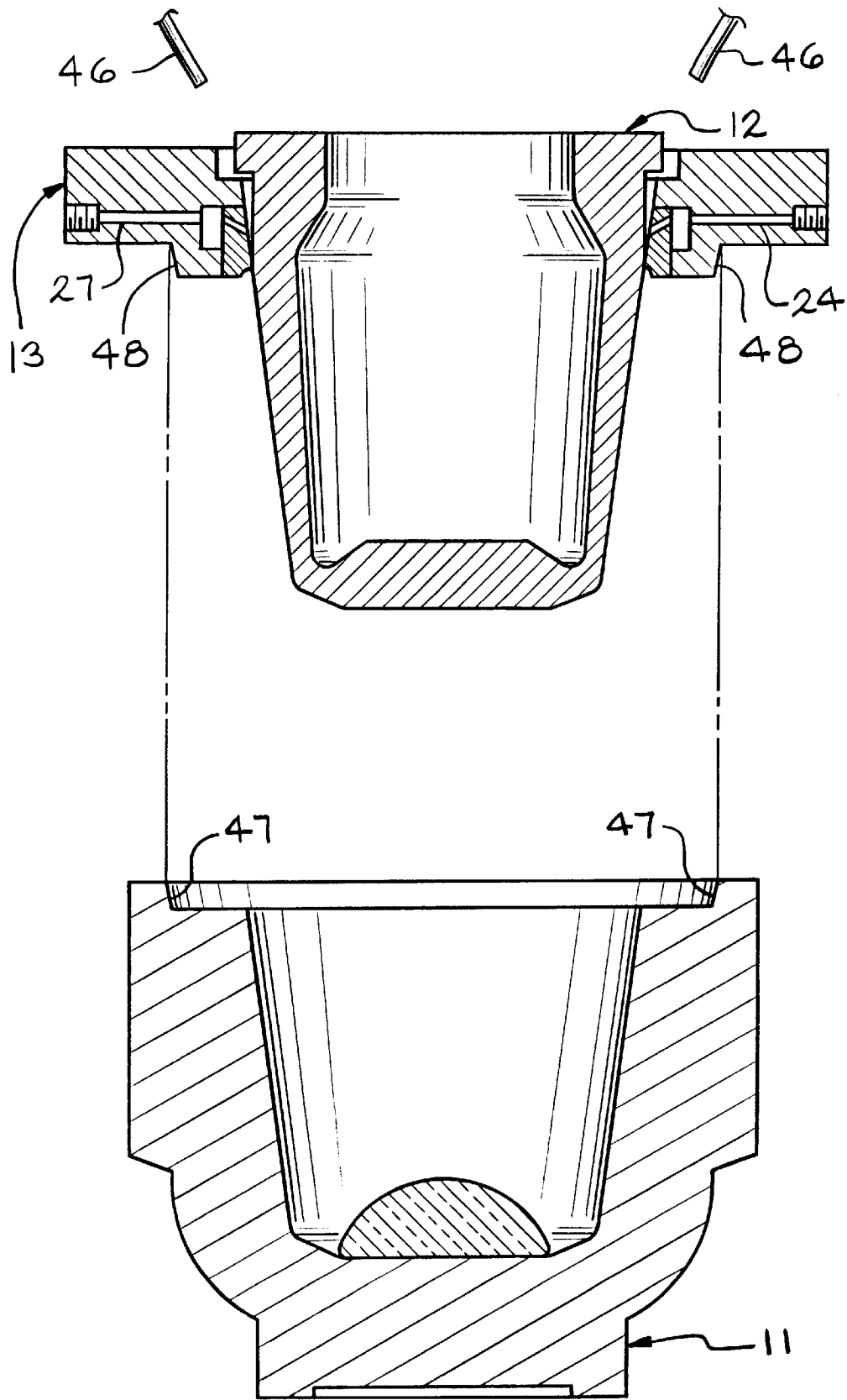
FIG. 4 is a view similar to FIG. 2, partially schematic and in partial longitudinal cross section, showing glass pressing apparatus, and illustrating one step in the sequence of operations involved in producing a pressed glass article according to the method of the present invention.

The glass pressing apparatus of FIGS. 1 and 2 was operated to form a gob 44 (FIG. 4) of softened glass into a pressed glass crock pot 16 (FIG. 2) which had a diameter of 8 inches (20.3 cm) and a height from the bottom to a rim 45 of 6 inches (15.2 cm). The process illustrated in FIGS. 2 and 4 of the drawings, and described below with reference thereto, was used. Each time is the plunger 12 and the manifold 13 were in the raised or open position shown in FIG. 4, a gas at a temperature of substantially −47° F. (−44° C.), and consisting essentially of a mixture of 67 percent by weight of methane and substantially 33 percent by weight of a "C-53 gas" (subsequently identified), was charged into the gas inlet 24 of the manifold 13. The C 53 gas was charged, as a liquid, from a pressurized supply tank (not illustrated), pressure about 100 psi. into one tube of a venturi mixer (not shown); the methane was charged from a utility supply line (not illustrated) into the other tube of the venturi. Mixing occurred in a two way Humphrey valve (not illustrated) between the venturi and the gas inlet 24. The Humphrey valve was opened to charge the mixture of the methane and the C 53 gas into the inlet 24, and was left open for about one half second. It will be noted that the orifices 26 direct the gas mixture into a space that is triangular in cross section between the substantially vertical surface 15 of the plunger 12 and the surface 14 of the annular manifold 13, which tapers slightly inwardly from top to bottom. After the gas mixture was charged and ignited by flames from burners 46, the plunger 12, driven by a hydraulic press (not shown), was advanced from the position shown in FIG. 4 into the gob 44 of softened glass, pressing the glass into the shape of the crock pot 16 (FIG. 2), and moving the annular manifold 13, which is spring loaded into contact with the manifold, from the position shown in FIG. 4 to that shown in FIG. 2; a tapered surface 47 (see FIG. 4) of the mold 11 and a cooperating surface 48 of the manifold 13 positioned the latter relative to the former at the end of this movement. As the plunger 12 and the manifold 13 were advanced from the position shown in FIG. 4 to that shown in FIG. 2 the tapered surface 14 of the manifold 13 positioned the plunger 12 relative to the manifold 13. Although contact between the gas mixture and the portion of the plunger which contacts the softened glass was minimized, the structure has been found to provide sufficient lubrication. Indeed, the number of mold and plunger changes required during a given period of operation of the apparatus as described in the foregoing Example have been found to be about half those required when kerosene or mineral oil was sprayed onto the plunger.

The C 53 gas used as described above in the Example is available from any commercial petrochemical stream under the indicated name. Its composition has varied over the years, but it is presently a blend of methyl acetylene and propadiene (about 45 mole percent), propylene (about 45 mole percent), and butane and propane, (about 10 mole percent).

It has been found that a carbonaceous deposit on the plunger, if it appears when the apparatus is being operated as described in the Example, can be wiped off, or can be removed by increasing the proportion of methane in the gas mixture used for 5 or 6 cycles.

It will be appreciated that various changes and modifications can be made from the specific details of the invention as described above and shown in the attached drawings without departing from the spirit and scope thereof as defined in the attached claims.

We claim:

1. In an apparatus which comprises a metal mold, a metal plunger and an annular manifold, and includes means for moving the plunger and the manifold between an open position in which the manifold surrounds the plunger and a gob of softened glass can be introduced into the mold and a closed position in which the manifold surrounds the plunger and the plunger forms, with the mold and the manifold, a cavity in which a glass part is formed, the manifold and the plunger having facing walls which are above the mold cavity, with portions which are in close fitting sliding engagement and, above said close fitting portions are walls which diverge away from one another and form an annular space, means for causing a gas which is a mixture of at least one alkane and at least one unsaturated aliphatic hydrocarbon to flow from said annular manifold around the exterior of the plunger, through orifices which extend downwardly and inwardly through the manifold and into contact with the plunger, the improvement comprising said orifices being operable to discharge the gas mixture into the annular space formed by the diverging walls of the manifold and plunger, and the apparatus including means for directing a flame against the plunger below the portion of the plunger wall which is in close fitting sliding engagment with walls of the manifold to ignite the gas mixture.

2. In apparatus as claimed in claim 1, the further improvement wherein there is an annular groove in the manifold which is open to the interior of the manifold, and an annular ring with downwardly and inwardly facing orifices extending therethrough which is releasably engaged with the manifold and, except for the orifices, closes the groove in the manifold.

3. In apparatus as claimed in claim 2, the improvement wherein an exterior surface of said annular ring is frictionally engaged with a surface of the manifold.

4. In apparatus as claimed in claim 2, the improvement wherein said annular ring is brazed to walls of the manifold which adjoin the annular groove therein.

5. A method for operating apparatus which comprises a metal mold, a metal plunger and an annular manifold, and includes means for moving the plunger and the manifold between an open position in which the manifold surrounds the plunger and a gob of softened glass can be introduced into the mold and a closed position in which the manifold surrounds the plunger and the plunger forms, with the mold and the manifold, a cavity in which a glass part is formed, the manifold and the plunger having facing walls which are above the mold cavity, with portions which are in close fitting sliding engagement, and above said close fitting portions are walls which diverge away from one another and form an annular space, said method comprising mixing at least one alkane and at least one unsaturated aliphatic hydrocarbon, causing the mixture to flow into the annular space formed by the diverging walls of the manifold and plunger while the manifold and the plunger are in the open position, and igniting the gas mixture by directing a flame against the plunger wall below the portion thereof which is in close fitting sliding engagement with a portion of the manifold wall.

* * * * *